(12) United States Patent
Lee et al.

(10) Patent No.: US 10,593,930 B2
(45) Date of Patent: Mar. 17, 2020

(54) HIGH CAPACITY ELECTRODE ACTIVE MATERIAL FOR LITHIUM SECONDARY BATTERY AND LITHIUM SECONDARY BATTERY USING THE SAME

(71) Applicant: LG Chem, Ltd., Seoul (KR)

(72) Inventors: Yong-Ju Lee, Daejeon (KR); Je-Young Kim, Daejeon (KR); Mi-Rim Lee, Daejeon (KR); Byung-Hun Oh, Daejeon (KR); Seung-Youn Choi, Daejeon (KR)

(73) Assignee: LG Chem, Ltd. (KR)

( * ) Notice: Subject to any disclaimer, the term of this patent is extended or adjusted under 35 U.S.C. 154(b) by 19 days.

(21) Appl. No.: 14/439,524

(22) PCT Filed: Jun. 20, 2014

(86) PCT No.: PCT/KR2014/005493
§ 371 (c)(1),
(2) Date: Apr. 29, 2015

(87) PCT Pub. No.: WO2014/204278
PCT Pub. Date: Dec. 24, 2014

(65) Prior Publication Data
US 2015/0318543 A1  Nov. 5, 2015

(30) Foreign Application Priority Data

Jun. 20, 2013  (KR) .................. 10-2013-0071020
Jun. 20, 2014  (KR) .................. 10-2014-0075986

(51) Int. Cl.
*H01M 4/133* (2010.01)
*H01M 4/36* (2006.01)
(Continued)

(52) U.S. Cl.
CPC ........... *H01M 4/133* (2013.01); *H01M 4/134* (2013.01); *H01M 4/366* (2013.01); *H01M 4/38* (2013.01);
(Continued)

(58) Field of Classification Search
CPC ...... H01M 4/133; H01M 4/134; H01M 4/366; H01M 4/38; H01M 4/386; H01M 4/387;
(Continued)

(56) References Cited

U.S. PATENT DOCUMENTS

2002/0009646 A1* 1/2002 Matsubara ............... H01M 2/32
429/231.8
2002/0164479 A1* 11/2002 Matsubara ............... A46D 1/00
428/364
(Continued)

FOREIGN PATENT DOCUMENTS

CN   102479948 A  *  5/2012  ............ H01M 4/362
CN   102479949 A  *  5/2012  ............ H01M 4/362
(Continued)

OTHER PUBLICATIONS

Gu, Meng, et al. "In situ TEM study of lithiation behavior of silicon nanoparticles attached to and embedded in a carbon matrix." Acs Nano 6.9 (2012): 8439-8447. (Year: 2012).*
(Continued)

*Primary Examiner* — Stewart A Fraser
(74) *Attorney, Agent, or Firm* — Lerner, David, Littenberg, Krumholz & Mentlik, LLP (57) ABSTRACT

Disclosed is an electrode active material for a lithium secondary battery including a first material including a carbon material, a second material of a nanostructure formed on the first material, the second material including at least one selected from a metal and a metalloid capable of reversibly alloying with lithium, and a third material present
(Continued)

on a surface of at least one of the first material and the second material to control a side reaction with an electrolyte solution, an electrode including the electrode active material, and a lithium secondary battery having the electrode.

20 Claims, 2 Drawing Sheets (51) Int. Cl.
    *H01M 4/62* (2006.01)
    *H01M 10/052* (2010.01)
    *H01M 4/38* (2006.01)
    *H01M 4/46* (2006.01)
    *H01M 4/134* (2010.01)
    *H01M 10/42* (2006.01)
    *H01M 4/02* (2006.01)
    *H01M 4/587* (2010.01)

(52) U.S. Cl.
    CPC ........... *H01M 4/386* (2013.01); *H01M 4/387* (2013.01); *H01M 4/463* (2013.01); *H01M 4/62* (2013.01); *H01M 4/625* (2013.01); *H01M 10/4235* (2013.01); *H01M 4/587* (2013.01); *H01M 10/052* (2013.01); *H01M 2004/021* (2013.01); *H01M 2004/025* (2013.01)

(58) Field of Classification Search
    CPC ...... H01M 4/436; H01M 4/625; H01M 4/587; H01M 10/052; H01M 2004/021
    See application file for complete search history.

(56) References Cited

U.S. PATENT DOCUMENTS

| | | | | |
|---|---|---|---|---|
| 2004/0214085 | A1* | 10/2004 | Sheem | H01M 4/134 |
| | | | | 429/218.1 |
| 2006/0134516 | A1 | 6/2006 | Im et al. | |
| 2010/0136431 | A1* | 6/2010 | Lee | H01M 4/13 |
| | | | | 429/231.8 |
| 2010/0143798 | A1* | 6/2010 | Zhamu | H01M 4/133 |
| | | | | 429/212 |
| 2010/0279172 | A1* | 11/2010 | Hwang | H01M 4/131 |
| | | | | 429/219 |
| 2010/0330419 | A1 | 12/2010 | Cui et al. | |
| 2010/0330421 | A1 | 12/2010 | Cui et al. | |
| 2011/0244322 | A1 | 10/2011 | Hong et al. | |
| 2011/0281180 | A1 | 11/2011 | Kim et al. | |
| 2012/0094178 | A1* | 4/2012 | Loveridge | H01M 4/134 |
| | | | | 429/217 |
| 2012/0135303 | A1 | 5/2012 | Hong et al. | |
| 2013/0089784 | A1 | 4/2013 | Cho et al. | |
| 2013/0130115 | A1 | 5/2013 | Park et al. | |
| 2013/0224581 | A1* | 8/2013 | Saito | H01M 4/13 |
| | | | | 429/211 |
| 2013/0244087 | A1* | 9/2013 | Ma | H01M 4/362 |
| | | | | 429/163 |
| 2013/0252031 | A1* | 9/2013 | Ma | H01M 4/362 |
| | | | | 429/5 |
| 2014/0050984 | A1 | 2/2014 | Park et al. | |
| 2014/0087233 | A1 | 3/2014 | Hong et al. | |
| 2014/0302396 | A1 | 10/2014 | Lu et al. | |

FOREIGN PATENT DOCUMENTS

| | | |
|---|---|---|
| EP | 2450988 A1 | 5/2012 |
| JP | 2006173121 A | 6/2006 |
| JP | 2011503782 A | 1/2011 |
| JP | 2011515012 A | 5/2011 |
| JP | 2011521436 A | 7/2011 |
| JP | 2012084554 A | 4/2012 |
| JP | 2014038846 A | 2/2014 |
| JP | 2014518432 A | 7/2014 |
| KR | 101013937 B1 | 2/2011 |
| KR | 20110126055 A | 11/2011 |
| KR | 20120024856 A | 3/2012 |
| KR | 20130037090 A | 4/2013 |
| KR | 20130056668 A | 5/2013 |
| WO | 2010035919 A1 | 4/2010 |
| WO | 2012071914 A1 | 6/2012 |
| WO | 2013067956 A1 | 5/2013 |

OTHER PUBLICATIONS

International Search Report for Application No. PCT/KR2014/005493 dated Oct. 28, 2014.

Khomenko et al., "Lithium-ion batteries based on carbon-silicon-graphite composite anodes." Journal of Power Sources, Elsevier SA, CH, vol. 165, No. 2, Feb. 28, 2007, pp. 598-608. XP005914502, ISSN: 0378-7753, DOI 10.1016/J.JPOWSOUR.2006.10.059.

Extended Search Report from European Application No. 14813625.2, dated Jun. 28, 2016.

* cited by examiner

HIGH CAPACITY ELECTRODE ACTIVE MATERIAL FOR LITHIUM SECONDARY BATTERY AND LITHIUM SECONDARY BATTERY USING THE SAME

CROSS-REFERENCE TO RELATED APPLICATIONS

The present application is a national phase entry under 35 U.S.C. § 371 of International Application No. PCT/KR2014/005493 filed Jun. 20, 2014, which claims priority from Korean Application No. 10-2013-0071020 filed Jun. 20, 2013 and Korean Application No. 10-2014-0075986 filed Jun. 20, 2014, all of which are hereby incorporated herein by reference.

TECHNICAL FIELD

The present disclosure relates to an electrode active material for a lithium secondary battery and a lithium secondary battery using the same, and more particularly, to a high capacity electrode active material for a lithium secondary battery comprising a third material to control a side reaction with an electrolyte solution on a surface of a second material of a nanostructure formed on a first material including a carbon material and a lithium secondary battery using the same.

BACKGROUND ART

Recently, there has been growing interest in energy storage technologies. As the application fields of energy storage technologies have been extended to mobile phones, camcorders, lap-top computers and even electric cars, efforts have been increasingly made towards the research and development of electrochemical devices. In this aspect, electrochemical devices have attracted the most attention, and among them, the development of rechargeable secondary batteries has been the focus of particular interest. Recently, in the development of such batteries, research and development for new electrode and battery design is being done to improve a capacity density and specific energy.

Among currently available secondary batteries, lithium secondary batteries developed in the early 1990's have received a great deal of attention due to their advantages of higher operating voltages and even higher energy densities than traditional batteries using an aqueous electrolyte solution such as Ni-MH, Ni—Cd, and $PbSO_4$ batteries and the like.

Generally, a lithium secondary battery is fabricated by making an anode and a cathode using a material capable of intercalating and deintercalating lithium ions, and filling an organic electrolyte solution or a polymer electrolyte solution in between the cathode and the anode, and produces electrical energy by an oxidation/reduction reaction when the lithium ions intercalate and deintercalate on the cathode and the anode.

Currently, carbon-based materials are primarily being used as an electrode active material for an anode of a lithium secondary battery. Among the carbon-based materials, graphite has a theoretical capacity of about 372 mAh/g, and an actual realizable capacity of current commercially available graphite is from about 350 to about 360 mAh/g. However, the capacity of the carbon-based material such as graphite is insufficient for a lithium secondary battery requiring a high capacity electrode active material.

To meet the demand, another electrode active material is a metal such as silicon (Si) and tin (Sn) that exhibits a higher charge/discharge capacity than a carbon-based material and is electrochemically alloyable with lithium. However, a metal-based electrode active material experiences cracking and pulverization due to a large volume change involved in lithium charging/discharging, and as a consequence, a secondary battery using a metal-based electrode active material has drawbacks of a drastic capacity drop and a short cycle life during charging/discharging cycles.

Accordingly, attempts have been made to use oxide of a metal, for example, Si and Sn, as an electrode active material, to alleviate cracking and pulverization of an electrode active material caused by the use of a metal-based electrode active material. In the case of oxide of a metal such as Si and Sn, due to uniform distribution of nanoscale metal elements in a carbon substrate, cracking and pulverization caused by a metal-based electrode active material may be effectively controlled, but there is a problem with reduced initial efficiency by an initial irreversible reaction between metal oxide and lithium.

To uniformly distribute a metal-based active material at a nanoscale level, studies are recently being made to grow a metal nanowire on a surface of a carbon-based material. However, cycle efficiency reduces by a continuous side reaction of a surface of a metal nanowire with an electrolyte solution, and due to its by-product, a phenomenon occurs in which resistance increases and an electrode thickness increases.

DISCLOSURE

Technical Problem

The present disclosure is directed to providing a high capacity electrode active material for a lithium secondary battery that may control a side reaction with an electrolyte solution, an electrode comprising the same, and a lithium secondary battery comprising the electrode.

Technical Solution

To achieve the above object, according to an aspect of the present disclosure, there is provided an electrode active material for a lithium secondary battery including a first material including a carbon material, a second material of a nanostructure formed on the first material, the second material including at least one selected from a metal and a metalloid capable of reversibly alloying with lithium, and a third material present on a surface of at least one of the first material and the second material to control a side reaction with an electrolyte solution.

The carbon material may be at least one selected from the group consisting of soft carbon, hard carbon, natural graphite, Kish graphite, pyrolytic carbon, mesophase pitch based carbon fiber, meso-carbon microbeads, mesophase pitches, and petroleum or coal tar pitch derived cokes.

The second material may be any one selected from the group consisting of Si, Sn, Al, Sb, Bi, As, Ge, and Pb, or mixtures or alloys thereof.

The second material may be made up of at least one nano structure among a nanoparticle, a nanowire, a nanorod, and a nanotube.

The nanoparticle may have an average diameter from 1 nm to 1,000 nm.

The nanowire may have a horizontal cross-sectional average diameter from 1 nm to 1,000 nm and an average length from 500 nm to 50 μm.

The third material may include any one selected from the group consisting of Si, Sn, Al, Sb, Bi, As, Ge, and Pb, or at least one selected from the group consisting of oxide or nitride thereof, carbon, and an organic material.

In this instance, the organic material may be may be any one selected from the group consisting of polyvinylidene fluoride, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyacrylic acid, polyvinylalcohl, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose, or mixtures thereof.

The third material may be present only on the surface of the second material.

The third material may have a thickness from 1 nm to 5 μm.

The electrode active material may be an anode active material.

According to an aspect of the present disclosure, there is provided an electrode for a lithium secondary battery including the electrode active material.

According to an aspect of the present disclosure, there is provided a lithium secondary battery having the electrode.

Advantageous Effects

The electrode active material according to an aspect of the present disclosure includes a first material including a carbon material, a second material of a nanostructure uniformly distributed on the first material, the second material including a metal or metalloid allowing repeated charge and discharge with lithium or a metal-metalloid compound, and a third material to control a side reaction with an electrolyte solution, to achieve high initial efficiency and efficiently suppress volume expansion and a continuous side reaction of an electrolyte solution caused by pulverization of an electrode active material occurring during battery charge and discharge, so an electrode active material having excellent life characteristics and a thickness control capability while maintaining high capacity characteristics of a metal-based electrode active material and a lithium secondary battery may be manufactured.

MODE FOR CARRYING OUT THE INVENTION

Hereinafter, the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

An electrode active material according to an aspect of the present disclosure includes a first material including a carbon material, a second material of a nanostructure formed on the first material, the second material including at least one selected from a metal and a metalloid capable of reversibly alloying with lithium, and a third material present on a surface of at least one of the first material and the second material to control a side reaction with an electrolyte solution.

The metal and the metalloid capable of reversibly alloying with lithium is a metal-based electrode active material, and exhibit a higher charge/discharge capacity than a carbon material. However, the metal-based electrode active material is susceptible to cracking and pulverization due to a large volume expansion involved in charging and discharging of lithium. In the end, the metal-based electrode active material suffers a drastic capacity drop and a short cycle life during charging/discharging cycles of a battery.

Thus, according to an aspect of the present disclosure, it was intended to alleviate and effective control cracking and pulverization of the electrode active material by forming and distributing the second material on the first material including the carbon material, the second material including at least one selected from a metal and a metalloid capable of reversibly alloying with lithium, so that the second material has a nanoscale structure.

The carbon material may include low crystalline carbon and high crystalline carbon. The low crystalline carbon typically includes soft carbon and hard carbon, and the high crystalline carbon typically includes high temperature baked carbon, for example, natural graphite, Kish graphite, pyrolytic carbon, mesophase pitch based carbon fiber, mesocarbon microbeads, mesophase pitches, and petroleum or coal tar pitch derived cokes.

In this instance, natural graphite and artificial graphite may be scaly or spherical, and at least two fine graphite particles may be granulated to form a secondary particle.

The second material is in a nanostructure shape, and is formed on the first material.

With the recent movement toward light weight, minimization, and multifunction of a mobile device in which a lithium secondary battery operates, a solution to satisfy a long operating time is to improve a batter energy density as a power source, but in the case of a carbon material such as graphite, because a theoretical storage capacity ($LiC_6$) of lithium is limited to about 372 mAh/g, to overcome this problem, there is the need to introduce a material having a larger lithium storage capacity as an anode active material.

Accordingly, the second material is not limited to a specific material if it is a metal or metalloid capable of reacting with and reversibly alloying with lithium or a compound thereof, having a higher capacity than the first material, and able to suppress the volume change of the first material in the absence of any continuous volume expansion caused by a reaction with lithium during battery charge and discharge.

Specifically, the second material may be a mixture or alloy of metals or metalloids selected from the group consisting of groups 13 and 14 of the periodic table, and more specifically, any one selected from the group consisting of Si, Sn, Al, Sb, Bi, As, Ge, and Pb, or mixtures or alloys thereof, and their compound may include, but is not limited to, oxide, nitride, a boron compound, fluoride, phosphide, and sulfide of the metal or metalloid.

The content of the second material may be, for example, from 1 to 70 parts by weight, from 5 to 70 parts by weight, or from 5 to 50 parts by weight based on 100 parts by weight of the first material. When the content of the second material satisfies the range, deterioration in life characteristics caused by excessive volume expansion may be prevented while achieving a high capacity.

Meanwhile, at initial battery charging, due to an alloying reaction with lithium of the second material including a metal or metalloid capable of reacting with and reversibly alloying with lithium, cracking within particles caused by excessive volume expansion occurs, and subsequently if an additional alloying reaction lasts, a new surface is formed due to destruction caused by cracking, and as a result, a solid electrolyte interphase (SEI) layer may be newly formed on the surface due to decomposition of an electrolyte solution. In this instance, because particle cracking occurs irregularly, isolated fragments inside the particles fail to participate in an electrochemical reaction, finally leading to a capacity loss.

Accordingly, to prevent cracking of the metal particles, according to an aspect of the present disclosure, the second material is formed on the first material in a nanostructure form.

That is, an extent of volume change occurring when the second material reacts with lithium is influenced by a size of the metal or metalloid particles included in the second material, and accordingly, through reducing the size of the metal or metalloid particles to a smaller size, that is, through a nanostructure, volume expansion caused by a reaction with lithium may be absorbed to minimize the occurrence of mechanical stresses of an electrode, thereby achieving stable charging and discharging.

The term "nanostructure" generally represents a structure having at least two dimensions on the nanoscale, and the term "nanoscale" generally represents a dimension of less than 1 μm.

The form of the nanostructure may include, but is not limited to, a nanoparticle, a nanowire, a nanorod, a nanotube, and the like. For example, the term "nanoparticle" represents a nanostructure typically having at least two dimensions less than micron (<1 μm) generally in a spherical shape, and the term "nanowire" represents a nanostructure typically having at least two dimensions less than micron (<1 μm) generally in a cylindrical shape.

When the nanostructure of the second material is a nanoparticle, the nanoparticle may have, for example, an average diameter from 1 nm to 1,000 nm, from 1 nm to 500 nm, or from 5 nm to 100 nm.

When the average diameter of the nanoparticle satisfies the range, volume expansion caused by a reaction with lithium may be absorbed to minimize the occurrence of mechanical stresses of an electrode, thereby achieving stable charging and discharging.

When the nanostructure of the second material is a nanowire, the nanowire may have, for example, a horizontal cross-sectional average diameter from 1 nm to 1,000 nm, from 1 nm to 500 nm, or from 5 nm to 100 nm, and an average length from 500 nm to 50 μm, from 500 nm to 20 μm, or from 1 μm to 20 μm.

When the horizontal cross-sectional average diameter and the average length of the nanowire satisfy the ranges, volume expansion caused by a reaction with lithium may be absorbed to minimize the occurrence of mechanical stresses of an electrode, thereby achieving stable charging and discharging.

Also, the third material is formed on the surface of at least one of the first material and the second material. The third material serves to prevent an irreversible and very large initial capacity decrease caused by an SEI layer formed by decomposition of an electrolyte solution occurring due to electron transfer from at least one of the first material and the second material to the electrolyte solution at initial charging. Specifically, the third material may prevent a subsequent reduction in cycle efficiency of the battery caused by a side reaction occurring due to a continuous contact of the first material and the second material with the electrolyte solution, and a phenomenon in which the resistance increases and an electrode thickness increases due to a by-product of the side reaction.

The third material may be, for example, formed as a coating layer on the surface of at least one of the first material and the second material, and a thickness of the third material may be, for example, from 1 nm to 5 μm, from 5 nm to 5 μm, or from 5 nm to 1 μm.

When the thickness of the third material satisfies the range, a decomposition reaction of an electrolyte solution and volume expansion of an electrode active material may be efficiently suppressed and a resistance increase of an electrode may be prevented, thereby achieving smooth charging and discharging.

The third material is not limited to a specific material if it is capable of controlling a side reaction between the first and second materials and an electrolyte solution. A non-limiting example of the third material may include, but is not limited to, an organic material and a metal or metalloid selected from the group consisting of groups 13 and 14 of the periodic table, more specifically, any one selected from the group consisting of Si, Sn, Al, Sb, Bi, As, Ge, and Pb, or oxide or nitride thereof, and carbon.

In this instance, the organic material is not limited to a specific material if it is an organic solvent-based polymer applicable to an organic solvent such as water-soluble polymer, water-dispersible polymer, or N-methyl pyrrolidone (NMP), capable of controlling a side reaction between the first and second materials and an electrolyte solution.

The organic material may be any one selected from the group consisting of polyvinylidene fluoride, polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyethylene-co-vinyl acetate, polyethylene oxide, polyacrylic acid, polyvinylalcohl, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, and carboxyl methyl cellulose, or mixtures thereof.

The third material has no reactivity with a lithium ion or an electrolyte solution, or after reaction, may form a stable coating layer to suppress a side reaction between the first and second materials and an electrolyte solution.

The content of the third material may be, for example, from 0.5 to 100 parts by weight, from 0.5 to 50 parts by weight, or from 1 to 20 parts by weight based on 100 parts by weight of the second material. When the content of the third material satisfies the range, a by-product may be prevented from being produced by a reaction between the second material and an electrolyte solution, so problems with a resistance increase, deterioration of cycle characteristics, and thickness expansion caused by a by-product increase may be solved.

A detailed description of a method for manufacturing an electrode active material according to an aspect of the present disclosure is provided as follows.

First, the nanostructure of the second material may be formed on the surface of the first material by quite various methods, but as a non-limiting example, the nanostructure may be formed using a method selected from the group consisting of chemical vapor deposition (CVD), metal-organic chemical vapor deposition (MOCVD), plasma-enhanced chemical vapor deposition (PECVD), hot wire chemical vapor deposition (HWCVD), sputtering, atomic layer deposition, electrochemical deposition, chemical solution deposition, and combinations thereof.

In an exemplary embodiment of the present disclosure, the nanostructure of the second material is provided by catalytic growth from the metal nanoparticles, and in this instance, the metal nanoparticles may be present in a nanoporous template, and may include a metal selected from the group consisting of gold (Au), indium (In), gallium (Ga), and iron (Fe).

Subsequently, through chemical vapor deposition (CVD) or thermal treatment under a particular gas atmosphere (oxygen or nitrogen), the third material is formed to exist on the surface of at least one of the first material and the second material.

In this instance, the third material may be formed to exist only on the surface of the second material, and this may be obtained by selectively forming through thermal treatment under a particular gas atmosphere such as oxygen or nitrogen.

When the third material exists only on the surface of the second material, in addition to a unique function of the third material of preventing a by-product from being produced by a side reaction of the second material, the third material coated on the surface of the first material may eliminate the possibility that a capacity of an active material will reduce.

Figure 1:
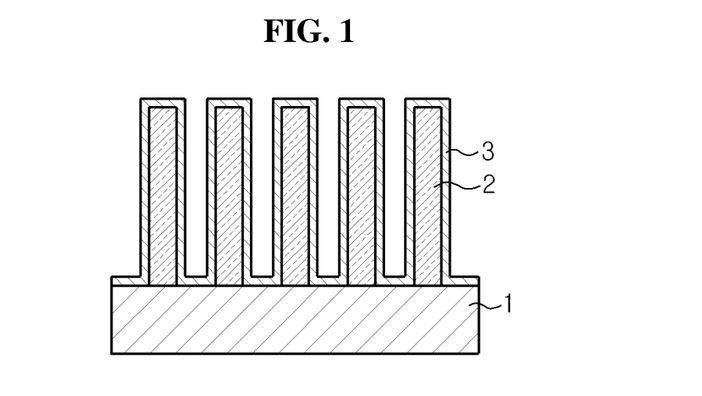
FIGS. 1 through 4 are schematic diagrams illustrating an electrode active material according to an exemplary embodiment of the present disclosure.
Figure 2:
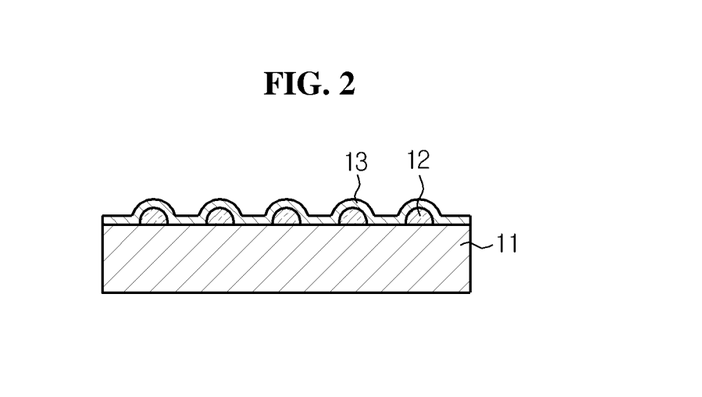

Referring to FIGS. 1 and 2, schematic diagrams illustrate electrode active materials according to an exemplary embodiment of the present invention in which third materials 3 and 13 are formed on the surfaces of both first materials 1 and 11 and second materials 2 and 12, respectively.

Figure 3:
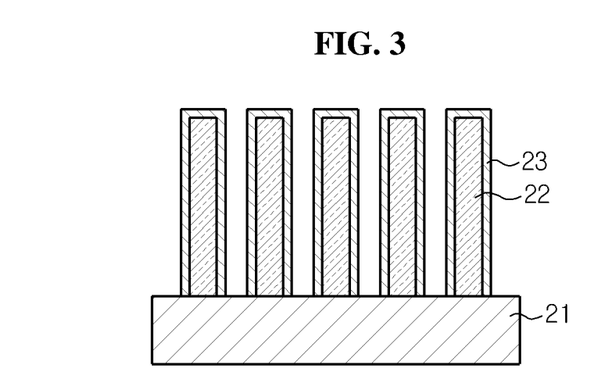
Figure 4:
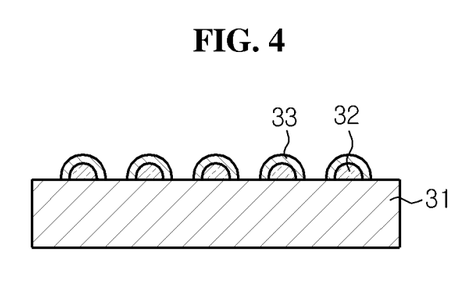

Referring to FIGS. 3 and 4, schematic diagrams illustrate electrode active materials according to an exemplary embodiment of the present invention in which third materials 23 and 33 are selectively formed only on the surfaces of second materials 22 and 32 while not being formed on the surfaces of first materials 21 and 31.

According to an aspect of the present disclosure, the electrode active material may be used as a cathode active material or an anode active material, preferably, an anode active material.

The electrode active material of the present disclosure may be manufactured into a cathode or an anode by a manufacturing method generally used in the art, and using this, a lithium secondary battery including a separator interposed between the cathode and the anode and an electrolyte solution generally applied in the art may be fabricated.

When the electrode active material according to an aspect of the present disclosure is used as a cathode active material, a carbon material capable of intercalating and deintercalating lithium ions, lithium metal, silicon, or tin may be generally used as an anode active material, and metal oxide having a potential for lithium less than or equal to 2 V, for example, $TiO_2$ and $SnO_2$, may be also used. The carbon material may include low crystalline carbon and high crystalline carbon. The low crystalline carbon typically includes soft carbon and hard carbon, and the high crystalline carbon typically includes high temperature baked carbon, for example, natural graphite, Kish graphite, pyrolytic carbon, mesophase pitch based carbon fiber, meso-carbon microbeads, mesophase pitches, and petroleum or coal tar pitch derived cokes.

When the electrode active material according to an aspect of the present disclosure is used as an anode active material, lithium-containing transition metal oxide may be preferably used as a cathode active material, for example, any one selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0 \le y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, and $LiFePO_4$, or mixtures thereof. Also, sulfide, selenide, and halide as well as oxide may be used.

In this instance, the anode and the cathode may further include a binder in addition to the anode active material and the cathode active material, and the binder may include various types of polymers, for example, polyvinylidene fluoride-co-hexafluoropropylene (PVDF-co-HFP), polyvinylidenefluoride, polyacrylonitrile, polymethylmethacrylate, carboxyl methyl cellulose (CMC), and styrene-butadiene rubber (SBR).

In the electrolyte solution used in the lithium secondary battery according to an aspect of the present disclosure, a lithium salt that may be included as an electrolyte is not limited to a specific type if it is generally used in an electrolyte solution for a lithium secondary battery, and an anion of the lithium salt may be, for example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

An organic solvent included in the electrolyte solution is not limited to a specific type if it is generally used in an electrolyte solution for a lithium secondary battery, as a typical example, any one selected from the group consisting of propylene carbonate (PC), ethylene carbonate (EC), diethyl carbonate (DEC), dimethyl carbonate (DMC), ethylmethylcarbonate (EMC), methyl propyl carbonate, dipropyl carbonate, dimethyl sulfoxide, acetonitrile, dimethoxyethane, diethoxyethane, vinylene carbonate, sulforane, gamma butyrolactone (γ-butyrolactone), propylene sulfide, and tetrahydrofuran, or mixtures thereof. Particularly, among the carbonate-based organic solvents, a cyclic carbonate such as ethylene carbonate and propylene carbonate is a high viscosity organic solvent, and may be preferably used because it dissociates a lithium salt in an electrolyte well due to having a high dielectric constant, and a mixture of cyclic carbonate and linear carbonate with a low viscosity and a low dielectric constant such as dimethyl carbonate and diethyl carbonate at a proper mix ratio may be more preferably used because it allows an electrolyte solution having high electrical conductivity to be prepared.

Optionally, the electrolyte solution may further include an additive, such as an overcharge inhibitor, included in a general electrolyte solution.

Also, the separator may use a general porous polymer film conventionally used as a separator, for example, a porous polymer film made of a polyolefin-based polymer such as an ethylene homopolymer, a propylene homopolymer, an ethylene/butene copolymer, an ethylene/hexene copolymer, and an ethylene/methacrylate copolymer, arranged singularly or in a stack, or a general porous non-woven fabric, for example, a non-woven fabric made of a glass fiber having a high melting point, a polyethyleneterephthalate fiber, and the like, however the present disclosure is not limited thereto.

A battery case used in the lithium secondary battery according to an aspect of the present disclosure may employ those generally used in the art, and is not limited to a specific outer shape based on the use of the battery, and the battery case may have, for example, a circular shape using a can, a prismatic shape, a pouch shape, a coin shape, and the like.

Hereinafter, the present disclosure will be described in detail through examples. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

<Manufacture of Electrode Active Material>

Embodiment Example 1-1

Nanosilicon was deposited on the surface of graphite having an average diameter ($D_{50}$) of 30 μm using an arc plasma deposition system.

As a result of inductively coupled plasma (ICP) analysis, it was found that a content of Si was 5 wt %, and it could be seen from scanning electron microscope (SEM) analysis that nanosilicon less than or equal to 50 nm was deposited on the graphite surface.

Subsequently, carbon coating was carried out on both nanosilicon and graphite of the nanosilicon-deposited graphite at 900° C. using acetylene gas, to eventually manufacture an electrode active material. In this instance, it was found that a content of carbon coated on the electrode active material was 5 wt %.

Embodiment Example 1-2

After dispersing nanosilicon-deposited graphite in ethanol, titanium iso-propoxide [$Ti(OCH(CH_3)_2)_4$] was mixed therewith, followed by evaporation of ethanol. Subsequently, after maintaining at 60° C. for 12 hours under an ambient atmosphere, titanium oxide ($TiO_2$) coating was carried out on both nanosilicon and graphite by thermal treatment at a temperature of 400° C., under an argon gas atmosphere, to eventually manufacture an electrode active material. In this instance, it was found that a content of titanium oxide coated on the electrode active material was 5 wt %.

Embodiment Example 1-3

By performing thermal treatment on nanosilicon-deposited graphite at 800° C. using oxygen gas of normal pressure, an electrode active material having a silicon oxide coating formed on the nanosilicon surface was manufactured. In this instance, in case in which thermal treatment is performed under an oxygen atmosphere, oxide is not coated on graphite, and silicon of nanosilicon bonds with oxygen to produce silicon oxide. Except silicon oxide coating is carried out, an electrode active material was manufactured by the same method as Embodiment example 1-1. In this instance, it was found that a content of silicon oxide coated on the electrode active material was 1 wt %.

Embodiment Example 1-4

Except coating of silicon nitride ($Si_3N_4$) only on the surface of nanosilicon using nanosilicon-deposited graphite in a nitrogen atmosphere under conditions of 1,200° C. and normal pressure, an electrode active material was manufactured by the same method as Embodiment example 1-1. In this instance, it was found that a content of silicon nitride coated on the electrode active material was 1 wt %.

Comparative Example 1-1

Nanosilicon was deposited on the surface of graphite having an average diameter ($D_{50}$) of 30 μm using an arc plasma deposition system, to manufacture an electrode active material.

As a result of ICP analysis, it was found that a content of Si is 5 wt %, and it could be seen from SEM analysis that nanosilicon less than or equal to 50 nm was deposited on the graphite surface.

<Manufacture of Electrode>

Embodiment Example 2-1

An anode slurry was prepared by mixing the electrode active material manufactured through embodiment example and comparative example with carboxyl methyl cellulose (CMC) and styrene-butadiene rubber (SBR), and was coated on a copper current collector, dried, and rolled such that an electrode density is 1.6 g/cc, to manufacture an anode.

Embodiment Example 2-2

An electrode was manufactured by the same method as Embodiment example 2-1 except the electrode active material manufactured in Embodiment example 1-2 was used.

Embodiment Example 2-3

An electrode was manufactured by the same method as Embodiment example 2-1 except the electrode active material manufactured in Embodiment example 1-3 was used.

Embodiment Example 2-4

An electrode was manufactured by the same method as Embodiment example 2-1 except the electrode active material manufactured in Embodiment example 1-4 was used.

Comparative Example 2-1

An electrode was manufactured by the same method as Embodiment example 2-1 except the electrode active material manufactured in Comparative example 1-1 was used.

<Manufacture of Secondary Battery>

Embodiment Example 3-1

After adding $LiPF_6$ to a non-aqueous electrolyte solvent in which ethylene carbonate (EC) and diethyl carbonate (DEC) was mixed at a weight ratio of 3:7 such that a concentration of $LiPF_6$ is 1M, 5 parts by weight of fluoro ethylene carbonate (FEC) based on the total 100 parts by weight of the non-aqueous electrolyte solvent and $LiPF_6$ was added thereto, to eventually prepare a non-aqueous electrolyte solution.

Subsequently, using an anode manufactured in embodiment example and comparative example as a working electrode and lithium metal as a reference electrode and a counter electrode, a coin half cell was manufactured by a general method.

Embodiment Example 3-2

A secondary battery was manufactured by the same method as Embodiment example 3-1 except the electrode manufactured in Embodiment example 2-2 was used as an anode.

Embodiment Example 3-3

A secondary battery was manufactured by the same method as Embodiment example 3-1 except the electrode manufactured in Embodiment example 2-3 was used as an anode.

Embodiment Example 3-4

A secondary battery was manufactured by the same method as Embodiment example 3-1 except the electrode manufactured in Embodiment example 2-4 was used as an anode.

Comparative Example 3-1

A secondary battery was manufactured by the same method as Embodiment example 3-1 except the electrode manufactured in Comparative example 2-1 was used as an anode.

Evaluation Example

Charging and Discharging Evaluation Method

Charging CC (constant current)/CV (constant voltage) (5 mV/0.005 C current cut-off) condition
Discharging CC (constant current) condition 1.5V
During initial two cycles, charging and discharging was performed at 0.1, and during $3^{rd}$ through $49^{th}$ cycles, charging and discharging was performed at 0.5 C. At $50^{th}$ cycle, charging and discharging was terminated in a charging state (lithium ions were put in the anode), and after disassembling, a thickness was measured and an electrode thickness change ratio was calculated.

TABLE 1

|  | Discharge capacity (mAh/g) | Initial efficiency (%) | Capacity retention ratio (%) ($49^{th}$ discharge capacity/$1^{st}$ discharge capacity * 100) | (At $50^{th}$ charging) Electrode thickness change ratio (%) (thickness change amount/initial thickness) |
|---|---|---|---|---|
| Embodiment example 3-1 | 476 | 91.8 | 97 | 46 |
| Embodiment example 3-2 | 481 | 90.6 | 98 | 48 |
| Embodiment example 3-3 | 472 | 90.9 | 98 | 43 |
| Embodiment example 3-4 | 475 | 91.9 | 96 | 46 |
| Comparative example 3-1 | 501 | 92.1 | 84 | 74 |

It was found that the secondary batteries according to Embodiment examples 3-1 through 3-4 were provided with the anode using the anode active material coated on the surface of nanosilicon and graphite composite, that is, only the surface of nanosilicon, or coated on the surface of both nanosilicon and graphite, so volume expansion of nanosilicon of the anode may be efficiently controlled and a side reaction with the electrolyte solution may be minimized, thereby improving life characteristics and reducing an electrode thickness change ratio when compared to Comparative example 3-1.

DESCRIPTION OF REFERENCE NUMERALS 1, 11, 21, 31: first material
2, 12, 22, 32: second material
3, 13, 23, 33: third material

What is claimed is:

1. An electrode active material for a lithium secondary battery, comprising:
   a microstructure of a first material, the first material including a carbon material;
   a nanostructure of a second material directly contacting the surface of the microstructure, wherein the nanostructure partially covers the surface of the microstructure and wherein the second material includes at least one selected from a metal and a metalloid capable of reversibly alloying with lithium; and
   a coating of a third material present on surfaces of both of the microstructure and the nanostructure to control a side reaction with an electrolyte solution, wherein the coating partially covers the surface of the microstructure such that a portion of the surface of the microstructure is exposed,
   wherein the third material includes any one selected from the group consisting of oxides or nitrides of Si, Sn, Al, Sb, Bi, As, Ge, and Pb, and
   wherein the second material and the third material are different materials.

2. The electrode active material for a lithium secondary battery according to claim 1, wherein the carbon material is at least one selected from the group consisting of soft carbon, hard carbon, natural graphite, Kish graphite, pyrolytic carbon, mesophase pitch based carbon fiber, mesocarbon microbeads, mesophase pitches, and petroleum or coal tar pitch derived cokes.

3. The electrode active material for a lithium secondary battery according to claim 1, wherein the second material is any one selected from the group consisting of Si, Sn, Al, Sb, Bi, As, Ge, and Pb, or mixtures or alloys thereof.

4. The electrode active material for a lithium secondary battery according to claim 1, wherein the nanostructure is at least one of a nanoparticle, a nanowire, a nanorod, and a nanotube.

5. The electrode active material for a lithium secondary battery according to claim 4, wherein the nanoparticle has an average diameter from 1 nm to 1,000 nm.

6. The electrode active material for a lithium secondary battery according to claim 4, wherein the nanowire has a horizontal cross-sectional average diameter from 1 nm to 1,000 nm and an average length from 500 nm to 50 μm.

7. The electrode active material for a lithium secondary battery according to claim 1, wherein the coating has a thickness from 1 nm to 5 μm.

8. The electrode active material for a lithium secondary battery according to claim 1, wherein the electrode active material is an anode active material.

9. An electrode for a lithium secondary battery comprising the electrode active material for a lithium secondary battery according to claim 1.

10. A lithium secondary battery comprising the electrode for a lithium secondary battery according to claim 9.

11. The electrode active material of claim 1, wherein the microstructure has a diameter of 30 µm.

12. A lithium secondary battery, comprising:
an electrode having an electrode active material; and
an electrolyte solution, wherein the electrode active material comprises:
a microstructure of a first material, the first material including a carbon material;
a nanostructure of a second material directly contacting the surface of the microstructure, wherein the nanostructure partially covers the surface of the microstructure and wherein the second material includes at least one selected from a metal and a metalloid capable of reversibly alloying with lithium; and
a coating of a third material present on surfaces of both of the microstructure and the nanostructure to control a side reaction with an electrolyte solution, wherein the coating partially covers the surface of the microstructure such that a portion of the surface of the microstructure is exposed to the electrolyte solution,
wherein the third material includes any one selected from the group consisting of oxides or nitrides of Si, Sn, Al, Sb, Bi, As, Ge, and Pb, and
wherein the second material and the third material are different materials.

13. The lithium secondary battery according to claim 12, wherein the coating has a thickness from 1 nm to 5 µm.

14. The lithium secondary battery according to claim 12, wherein the electrode active material is an anode active material.

15. The lithium secondary battery according to claim 12, wherein the carbon material is at least one selected from the group consisting of soft carbon, hard carbon, natural graphite, Kish graphite, pyrolytic carbon, mesophase pitch based carbon fiber, meso-carbon microbeads, mesophase pitches, and petroleum or coal tar pitch derived cokes.

16. The lithium secondary battery according to claim 12, wherein the second material is any one selected from the group consisting of Si, Sn, Al, Sb, Bi, As, Ge, and Pb, or mixtures or alloys thereof.

17. The lithium secondary battery according to claim 12, wherein the nanostructure is at least one of a nanoparticle, a nanowire, a nanorod, and a nanotube.

18. The lithium secondary battery according to claim 12, wherein the electrolyte solution comprises an electrolyte and an organic solvent.

19. The lithium secondary battery according to claim 12, wherein the coating is prepared by thermal treatment of the first and second materials in an oxygen atmosphere.

20. The electrode active material for a lithium secondary battery according to claim 1, wherein the coating is prepared by thermal treatment of the first and second materials in an oxygen atmosphere.

\* \* \* \* \*